United States Patent [19]

Kittel et al.

[11] Patent Number: 5,334,338
[45] Date of Patent: Aug. 2, 1994

[54] PROCESS FOR MANUFACTURING A SOUND INSULATING STRUCTURE

[75] Inventors: Christoph Kittel, Nienhagen; Hans Walendy, Wathlingen; Gerhard Burak, Adelheidsdorf; Manfred Hoffmann, Nienhof, all of Fed. Rep. of Germany

[73] Assignee: Dr. Alois Stankiewicz GmbH, Fed. Rep. of Germany

[21] Appl. No.: 895,213

[22] Filed: Jun. 8, 1992

Related U.S. Application Data

[63] Continuation of Ser. No. 325,288, Mar. 17, 1989, abandoned.

[30] Foreign Application Priority Data

Mar. 24, 1988 [DE] Fed. Rep. of Germany ....... 3809980

[51] Int. Cl.⁵ .............................................. B29C 67/22
[52] U.S. Cl. ..................................... 264/46.4; 264/46.6; 264/48; 264/53; 264/257
[58] Field of Search ................... 428/316.6; 264/46.4, 264/46.6, 53, 257, 48

[56] References Cited

U.S. PATENT DOCUMENTS

| | | | |
|---|---|---|---|
| 3,911,190 | 10/1975 | Myers et al. | 264/46.5 |
| 3,929,948 | 12/1975 | Welch et al. | 264/46.4 |
| 4,199,634 | 4/1980 | Pole et al. | 428/95 |
| 4,242,391 | 12/1980 | Reinhardt et al. | 428/316.6 |
| 4,476,183 | 10/1984 | Holtrop et al. | 428/316.6 |
| 4,488,619 | 12/1984 | O'Neill | 428/316.6 |
| 4,584,232 | 4/1986 | Frank et al. | 428/316.6 |
| 4,673,542 | 6/1987 | Wigner et al. | 264/46.7 |
| 4,758,294 | 7/1988 | Storch | 156/79 |
| 4,863,791 | 9/1989 | Steward et al. | 428/316.6 |
| 4,891,085 | 1/1990 | Mulligan | 428/316.6 |

FOREIGN PATENT DOCUMENTS

| | | |
|---|---|---|
| 2006741 | 3/1971 | Fed. Rep. of Germany .......... B60R 13/08 |
| 2557719 | 6/1977 | Fed. Rep. of Germany ... B32B 5/18 |
| 3043044 | 6/1982 | Fed. Rep. of Germany ... B32B 7/00 |
| 3104835 | 9/1982 | Fed. Rep. of Germany . |
| 3151296 | 7/1983 | Fed. Rep. of Germany .......... B32B 27/40 |
| 3510932 | 10/1986 | Fed. Rep. of Germany . |
| 3624427 | 1/1988 | Fed. Rep. of Germany . |

OTHER PUBLICATIONS

"Advanced Noise Control in Automotive Engineering," by H. Gahlau, Stankiewicz-Information NR. 130 (1987).
Stankowitz Information No. 130, *Advanced Noise control in Automative Engineering* (1987).

*Primary Examiner*—Allan R. Kuhns
*Attorney, Agent, or Firm*—Scully, Scott, Murphy & Presser

[57] ABSTRACT

A sound insulating structure is provided which is made by foam-backing a carpet in a single operation and which includes a consolidated layer with few or no cells followed by a cellular soft elastic layer. To this end structured materials such as fleece and/or cut foam into which foaming takes place in order to form the consolidated layer, are provided on the back of the carpet or of a foam-proof covering thereon.

15 Claims, 2 Drawing Sheets

CURVE 1: Acrylic fiber fleece 180 gm$^{-2}$ + carpet
CURVE 2: Separately produced heavy layer 2 kgm$^{-2}$ + carpet CURVE 1: Acrylic fiber fleece 1000 gm$^{-2}$ + carpet
CURVE 2: Separately produced heavy layer 2 kgm$^{-2}$ + carpet

PROCESS FOR MANUFACTURING A SOUND INSULATING STRUCTURE

This is a continuation of copending application(s) Ser. No. 325,288 filed on Mar. 17, 1989, now abandoned.

TECHNICAL FIELD OF THE INVENTION

The invention relates to a process for the manufacture of a sound insulating structure in which a semifinished material comprising a decorative covering with a backing of structured materials is foam-backed in a closed tool, to a sound insulating structure and to its use.

BACKGROUND OF THE INVENTION AND PRIOR ART

A textile surface covering with foam backing is known from DE-OS 31 04 835 in which the textile surface structure is provided with a carrier layer of open celled plastics material having small pore volume and the foam backing is applied to this carrier layer. Application of the foam backing occurs there to an exact contour in a closed mold, and venting occurs through the carrier layer. Besides an optimal appearance soundproofing should also be effected. Thus, in the sense of sound insulation it is a conventional mass-spring system with foam (or fleece) as a spring and flexible heavy layer in an acoustically optimal setting as an effective mass. These systems are advantageously made as shaped parts, and for use in passenger vehicles are provided with a carpet covering so that overall a carpet-compact-insulating part results (DE-OS 31 04 835).

The physical parameters of the spring and mass are adequately known, for example from DE-AS ZO 06 741, and different manufacturing processes for such carpet-compact-insulating components are part of the general state of the art.

In the course of optimising the material and decreasing the mass (weight) of sound insulation for vehicles, in particular passenger vehicles, many suggestions have been made as to how, despite the reduced use of insulating materials, at least the same noise comfort can be maintained in the vehicle. The potential for saving is determined essentially by the heavy layer, so that the attempts made have concentrated on reducing this heavy layer. However, it has become evident that a physically determined lower limit exists beneath which behaviour as in a conventional mass-spring system can no longer be brought about. Thus on going below this surface mass Loss of noise comfort inevitably occurs. In an earlier prior art document ( DE-AS 20 06 741) the lower limit of the surface mass was said to be about 4 to 5 kgm$^{-2}$ while today a further reduction down to about 2 kgm$^{-2}$ can be justified. This, however, is only possible if the impairment which necessarily results from reducing the surface mass is compensated by greatly improved acoustic properties of the foam. For this purpose so-called visco-elastic foams were dove loped as described in GAHLAU, H., Fortschrittliche Schallisolationen fur Automobile, Stankiewicz-Information No. 130, Dr. Alois Stankiewicz GmbH, 1987.

According to the prior art it is, however, always necessary to manufacture the heavy layer and the spring separately and to combine them with the decorative covering, usually a carpet.

OBJECT OF THE INVENTION

It is therefore the object of the invention to provide an improved process for manufacturing a sound insulating structure of the kind described in the introduction so that with a simple and economical structure the desired noise comfort is obtained. A further object is to provide a sound insulating structure which can be made according to this process.

SUMMARY OF THE INVENTION

The invention is based on the discovery that this can be achieved if the heavy layer, instead of being produced and manufactured separately, is produced in one operation in the course of the foam backing of the shaped carpet in the tool.

In accordance with the present invention a process for manufacturing a sound insulating structure is provided. That process includes disposing a decorative covering provided with a backing of structured material in a closed tool. Foaming is initiated in the closed tool. The foam is thereupon collapsed to form a consolidated layer with, at most, a few cells. Foaming is continued to form an elastic soft foam layer adjacent to the consolidated layer wherein the structured material is disposed between the consolidated layer and the elastic soft foam layer.

The foam used according to the invention for foam backing, in particular on a two-component polyurethane basis, gives in the tool, with the same chemical composition, layers having very different characteristics, namely a cell containing soft foam and a consolidated layer with no or only a few cells. Thus, according to the invention there is formed in single step an insulating structure made up of a soft foam as spring and an adjoining consolidated layer as heavy layer, which forms a unitary whole with the shaped carpet.

It is therefore of importance that the surface mass of this consolidated layer can be made lighter in weight than the lightest heavy layer according to the prior art referred to with only minor effects on the acoustic quality.

The essential advantage of the arrangement according to the invention is that by introducing a fleece or open-pored foam which is fixed to the back of the carpet, the consolidated layer is produced as it were by means of a catalyst. Owing to the loose structure of the fibers of the fleece or of the open-pored cut foam the liquid foam penetrates it during the foaming process, and the cell formation of the foam is prevented or at least considerably reduced in this region. The inherently foaming material as it were collapses and forms an almost compact, consolidated layer. The remaining residue of the added liquid material develops its cells as usual and fills all the remaining space of the mold. While the transition between these two layers is continuous, it extends over only a very small region of thickness of the overall structure so that the two layers can be distinguished clearly.

BRIEF DESCRIPTION OF THE DRAWINGS

The invention will now be explained in more detail with reference to an exemplary embodiment shown in the drawings, in which.

DETAILED DESCRIPTION OF A PREFERRED EMBODIMENT OF THE INVENTION

Figure 1:
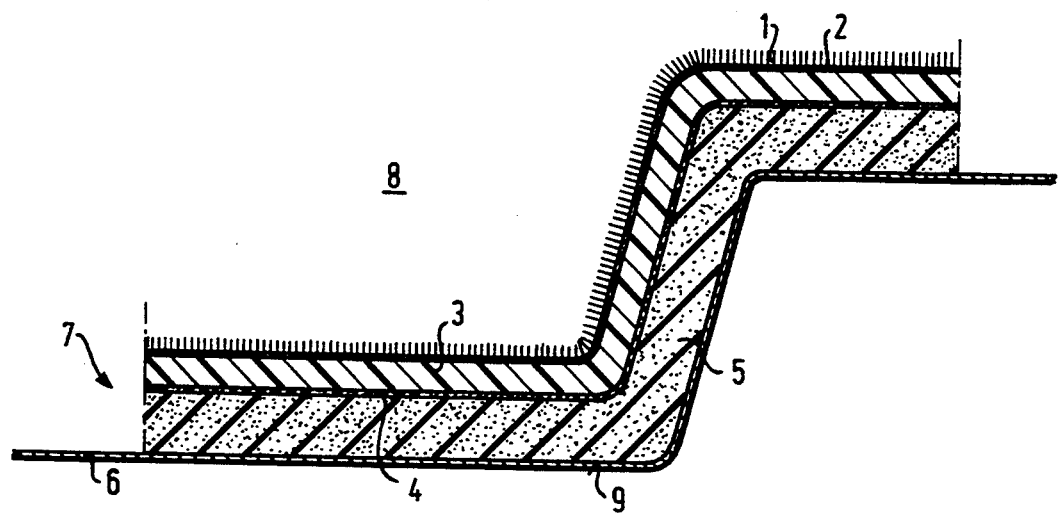
FIG. 1 shows a section through a foam-backed sound insulating structure according to the invention.

Referring to FIG. 1, a sound insulating structure 7 manufactured according to the invention comprises in a possible embodiment the following layers (viewed from an area 8 to be insulated): a shaped carpet layer 1 having foam-proof foil 2; a preferably flexible consolidated heavy layer 3; a foam-penetrable fleece covering 4 which may be arranged thereafter and/or be relatively thin; and a relatively thick elastic soft foam layer 5. A structure of this kind can be laid loosely on the pane 16 of a vehicle. However, since this hitherto conventional loose coupling between the structure 7 and the pane 16 is not sufficient to obtain loss factors in the front wall/floor region worth mentioning, and since on the other hand the use of adhesives is unfavorable for the assembly of large compact insulating parts, since in this case the assembly on a conveyor in a production line is almost impossible, according to a further development a force locked connection between the structure 7 and the panel is obtained by means of an adhesive coupling, which may be a frictional coupling, or adhesively tacking coating 9 on the soft foam layer 5 without the production process disadvantages of a fixed bond. Through this coupling it is possible to increase considerably the proofing against structure borne sound in the region covered by the insulating part.

The carpet 1 serves as decoration and forms the outer border to the passenger compartment 8. In a series of experiments the physical characteristics of the systems made according to the invention were compared with those of conventional mass-spring systems in which the heavy layer was produced separately and was shaped in a laminating press after being joined to the carpet. The thickness of the structures was about 22 to 26 mm, with the heavy layer in the conventional system having a surface mass of 2000 $gm^2$, plus the same average carpet surface mass of 885 $gm^2$ for all systems examined. The weight of polyurethane mixture used for producing the foams amounted in all cases to 1.6 In the closed tool a foam density of 88 $kgm^{-3}$ was obtained in the conventional system.

In a structure 7 of the kind according to the invention, which can be termed an ambivalent system, a consolidated polyester fleece having a surface mass of 200 $gm^2$ was used as a binder, with a foam-permeable fleece covering beneath it. The surface mass of the consolidated layer and of the carpet could thereby be reduced to 1710 $gm^{-2}$, i.e. by 37%, with the surface mass of the consolidated layer amounting to 812 $gm^{-2}$. The density of the soft foam amounted to 74 $kgm^{-3}$.

In a further experiment (FIG. 3), for the production according to the invention of the consolidated layer acrylic fiber fleece having a surface mass of 1000 $gm^{-2}$ was used, which resulted in a foam density of 75 $kgm^3$, i.e. a reduction of 15% compared with the conventional pattern. The surface mass of the heavy Layer including the carpet now amounted to 1950 $gm^{-2}$, and was thus reduced by compared with the conventional system. For the consolidated layer a surface mass of 1065 $gm^{-2}$ resulted.

For a (for the time being) final experiment (FIG. 2) an acrylic fiber fleece having a surface mass of about 180 $gm^{-2}$ was used. The density of the foam came to 53 $kgm^{-3}$, and thus there was a reduction of 40% compared with the conventional system. The surface mass of the consolidated layer (heavy layer) including the carpet came to 1710 $gm^{-2}$, synonymous with a reduction of 40% compared with the conventional system. The surface mass of the consolidated layer only amounted to 825 $gm^{-2}$.

Thus in the experiments (FIG. 3, FIG. 2) so far carried out it was possible to reduce the masses of the ambivalent insulating system to a substantial extent with the use of the same amount of foam and the same surface mass of carpet compared with a conventional system.

Figure 2:
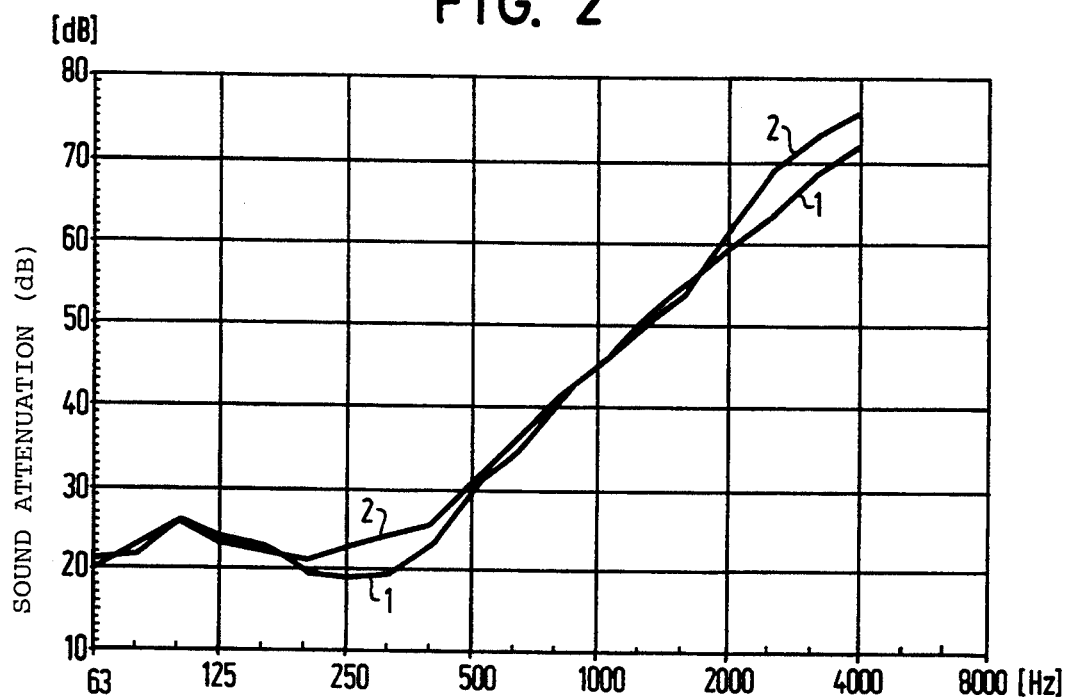
FIG. 2 shows the characteristics of the sound attenuation as a function of the frequency for a first system shown in FIG. 1 (curve 1) in comparison to the conventional system (curve 2)
Figure 3:
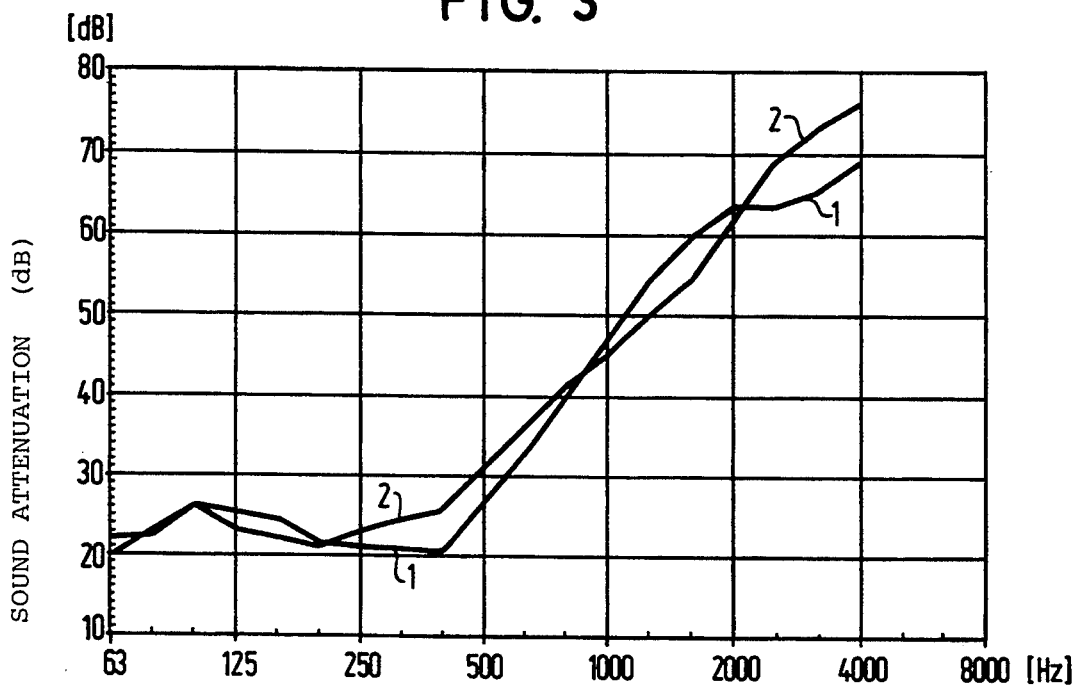
FIG. 3 shows the characteristics of the sound attenuation as a function of the frequency for a second system shown in FIG. 1 (curve 1) in comparison to the conventional system (curve 2).

The essential importance of the structure according to the invention is that the same noise comfort can be obtained in the vehicle despite the reduction of masses (weight) used. In this respect, to assess the extent to which this object could be achieved use was made of conventional mass-spring systems in which the heavy layer was produced separately, which were measured in accordance with DIN 52 210 in the constructional acoustic test stand. Comparative measurements were made of the structure according to the invention. The characteristic of the sound attenuation as a function of the frequency is shown in FIGS. 2 and 3. The results according to the curves 1 and 2 thus each enable a comparison with the conventional system to be made. This shows that, despite considerable reduction in the masses, approximately the same behaviour is obtained as in the conventional system (curve 2) owing to the different, obviously acoustically more favourable structure of the ambivalent insulating system (curve 1). Only in the frequency range between 200 and 400 Hz are negative differences to be seen, but it may be assumed that these can be rectified by optimizing the foam quality. In particular the loss factor of the foam must be further increased up to about 0.6, and the system may be made adhesive as in DE-OS 35 10 932. Further improvements can be expected through the use of decoupled layers as described in principle in DE-OS 36 24 427.

The experiments (see FIG. 2 and FIG. 3) carried out showed surprisingly that in addition the stability of shape of the ambivalent insulating system is considerably better than the conventional system. This is caused by the increased stiffness of the consolidated layer compared with the previously flexible form of the heavy layer in the conventional system. In connection with this it is furthermore surprising that despite the increased stiffness of the consolidated layer 3 acoustic equivalence to the conventional system can be brought about with the carpet 1. A possible explanation is the greatly reduced dynamic modulus of elasticity of the soft foam layer as produced in the ambivalent insulating system by means of the special manufacturing process. For example, the modulus of elasticity in the case of the foam mixture used in the experiments, depending on the structure of the ambivalent insulating system, is reduced by a factor of 4 to 8 compared with the conventional system. The loss factor remains the same. The manufacture of the ambivalent insulating system according to the invention is advantageously performed by providing the carpet 1 with an acrylic fiber fleece, a consolidated polyester fiber fleece or a polyethylene fleece as a fleece covering 4, possibly with a suitable foam-proof laminated foil 2 facing the carpet 1, and is subsequently put in a laminating press. The carpet 1 and fleece covering 4 can be produced continuously as sheet products. After being heated in the laminating press this composite is placed in the forming tool and heated up to an object temperature of about 160° to 165° C. Further processing by foam backing is then done in the usual manner. The special structure of the "ambivalent insulating system" according to the invention also leads to shorter cycle times in the mass production of carpet-compact-insulation components owing to the shortened heating period.

In addition to the process described above the fleeces and/or cut foams can also be attached in sections to the back of the carpet at particularly acoustically exposed positions. By this means different acoustic properties can be produced over the surface of the insulating part.

A separate, thin, foam-permeable fleece covering 4 spaced from the carpet 1 is particularly useful if these cut foams and/or fleeces are to be held against the rear side of the carpet 1 or the foam-proof foil covering 2 so as to make processing—for instance with a laminating press—possible.

The foam-proof foil covering 2 can be dispensed with if the carpet 1 itself is foam-proof since it is only important that during the foam-backing process no foam penetrates through the carpet 1 to its front side (visible side).

What is claimed is:

1. A process for manufacturing a sound insulating structure comprising disposing a decorative covering provided with a backing of structured material in a closed tool; initiating foaming in said closed tool, whereby a foam is formed; collapsing said foam to form a consolidated layer with at most a few cells; thereafter further foaming to form an elastic soft foam layer adjacent to said consolidated layer wherein said structured material is disposed between said consolidated layer and said soft foam layer.

2. A process for manufacturing a sound insulating structure according to claim 1 wherein the decorative covering is provided with a foam-proof laminated foil directly on its back.

3. A process for manufacturing a sound insulating structure according to claim 1 wherein said decorative covering is foam-proof.

4. A process for manufacturing a sound insulating structure according to claim 1 wherein a soft intermediate layer is disposed between said decorative covering and said consolidated layer for acoustic decoupling thereof.

5. A process for manufacturing a sound insulating structure according to claim 1 wherein said elastic soft foam layer is provided with an adhesive coating so as to obtain a force-locking connection between said foam of said sound insulating structure and the part to be insulated.

6. A process for manufacturing a sound insulating structure according to claim 1 wherein said foam used to produce said consolidated layer and said elastic soft foam layer has the same chemical composition.

7. Process for manufacturing a sound insulating structure according to claim 1 wherein at least one of a fleece and an open-pored cut foam is used as structured material.

8. Process for manufacturing a sound insulating structure according to claim 7 wherein a fleece having a surface mass between about 100 and 1000 $gm^{-2}$ is used.

9. Process for manufacturing a sound insulating structure according to claim 7 wherein a fleece having a surface mass of about 180 $mg^{-2}$ is used.

10. Process for manufacturing a sound insulating structure according to claim 7 wherein said fleece is an acrylic fiber fleece.

11. Process for manufacturing a sound insulating structure according to claim 7 wherein said fleece comprises fibers selected from polyester fibers and siliconized polyester fibers and is consolidated by means selected from thermal consolidation and the incorporation of a binder.

12. Process for manufacturing a sound insulating structure according to claim 7 wherein said fleece is polyethylene fleece.

13. A process for manufacturing a sound insulating structure according to claim 1 wherein said consolidated layer and said soft elastic foam layer are foamed using a physical foaming agent.

14. A process for manufacture a sound insulating structure according to claim 13 wherein said physical foaming agent is methylene chloride.

15. A process for manufacturing a sound insulating structure according to claim 1 wherein said decorative covering, said structured material selected from the group consisting of an acrylic fiber fleece, a consolidated polyester fiber fleece and a polyethylene fleece, and optionally a suitable foam-proof laminated foil facing said decorative covering, are introduced into a laminating press and heated to produce a composite, said composite is put into said closed tool, heated to a temperature of 160°–165° C. and then foam backed.

* * * * *